United States Patent [19]

Jennings et al.

[11] Patent Number: 5,164,458

[45] Date of Patent: * Nov. 17, 1992

[54] HIGH PERFORMANCE ENGINEERING POLYMER COMPOSITIONS

[75] Inventors: Thomas C. Jennings, Shaker Heights; David M. Tanno, Richmond Heights, both of Ohio

[73] Assignee: Synthetic Products Company, Cleveland, Ohio

[*] Notice: The portion of the term of this patent subsequent to Jan. 8, 2008 has been disclaimed.

[21] Appl. No.: 413,948

[22] Filed: Sep. 28, 1989

Related U.S. Application Data

[63] Continuation-in-part of Ser. No. 344,595, Apr. 28, 1989, Pat. No. 4,983,688.

[51] Int. Cl.$^5$ .................. C08L 67/03; C08L 69/00; C08L 71/12; C08L 81/06
[52] U.S. Cl. .................. 525/389; 525/397; 525/419; 525/434; 525/437; 525/439; 525/450; 525/462; 525/471; 525/534; 525/535; 525/537
[58] Field of Search ............ 525/389, 397, 419, 434, 525/437, 439, 450, 462, 471, 534, 535, 537; 524/396

[56] References Cited

U.S. PATENT DOCUMENTS

| | | | |
|---|---|---|---|
| 3,340,339 | 9/1967 | Ullman | 264/131 |
| 3,674,894 | 7/1972 | Economy et al. | 260/875 |
| 3,884,825 | 5/1975 | Linblad et al. | 252/62.1 |
| 3,973,982 | 8/1976 | Bingham | 106/298 |
| 4,096,109 | 6/1978 | Watanabe et al. | 260/40 R |
| 4,101,523 | 6/1978 | Watanabe et al. | 528/309 |
| 4,155,898 | 5/1979 | Bopp et al. | 260/40 R |
| 4,198,458 | 4/1980 | Mitsuishi et al. | 428/212 |
| 4,304,807 | 12/1981 | Kawakami et al. | 428/148 |
| 4,440,889 | 4/1984 | Hergenrother et al. | 524/143 |
| 4,461,797 | 7/1984 | Adachi et al. | 428/147 |
| 4,490,522 | 12/1984 | Kawabata et al. | 528/388 |
| 4,505,966 | 3/1985 | Adachi et al. | 428/141 |
| 4,710,531 | 12/1987 | Dozzi | 524/396 |
| 4,952,634 | 8/1990 | Grossman | 525/190 |

FOREIGN PATENT DOCUMENTS

| | | |
|---|---|---|
| 0221567 | 5/1987 | European Pat. Off. . |
| 0296877 | 12/1988 | European Pat. Off. . |
| 59-21933 | 2/1984 | Japan . |
| 1040605 | 9/1966 | United Kingdom . |

*Primary Examiner*—Patricia Short
*Attorney, Agent, or Firm*—Wood, Herron & Evans

[57] ABSTRACT

High performance engineering polymer (HPEP) compositions are disclosed containing a HPEP and a polymeric polyvalent metal aromatic polycarboxylate where the polymeric carboxylate is dispersible, nonmigratable, non-extractable and heat stable at processing temperatures of the HPEP. The compositions offer the physical properties of high mechanical strength, durability, toughness, chemical resistance and high temperature performance, among others. The engineering polymers are wholly aromatic polymers having aromatic rings forming the main chain of the polymer and devoid of methylene groups in the main chain. Polymeric metal carboxylates such as calcium terephthalate are employed as the high temperature additive in an effective amount for extending the engineering polymer while substantially maintaining or improving its engineering properties.

23 Claims, 1 Drawing Sheet

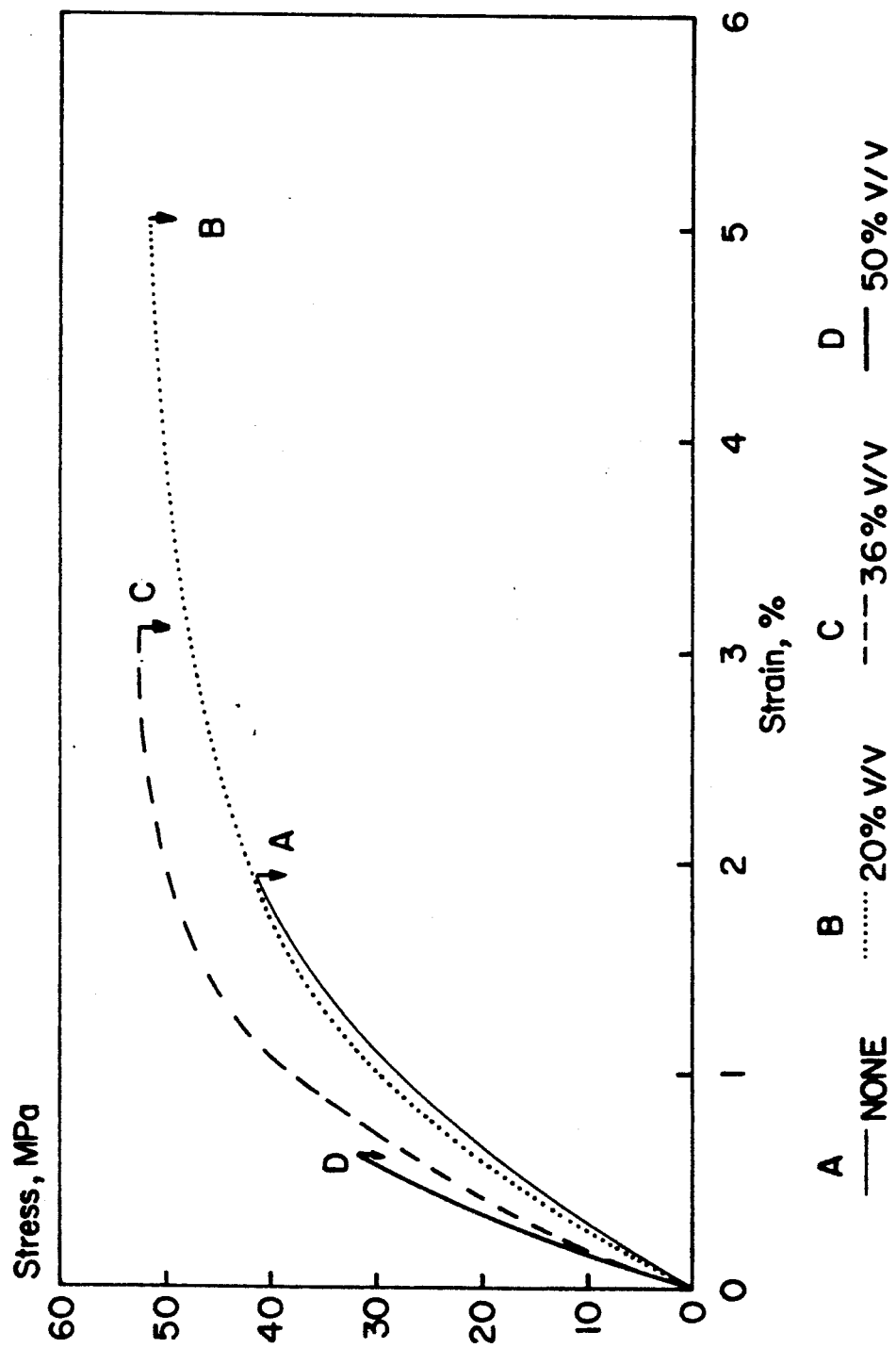

HIGH PERFORMANCE ENGINEERING POLYMER COMPOSITIONS

RELATED APPLICATION

This application is a continuation-in-part application of the U.S. application Ser. No. 344,595 filed Apr. 28, 1989 by Thomas C. Jennings and David M. Tanno now U.S. Pat. No. 4,983,688.

BACKGROUND OF THE INVENTION

High performance engineering polymers (HPEPs) offer a wide variety of key property requirements in molded articles including high mechanical strength, durability, toughness, chemical resistance and high temperature performance, among others. One of the most severe limitations to the use of high performance engineering polymers, such as liquid crystal polymers (LCPs), is the current high price of such polymers. It would be very desirable if improvements were made in HPEP compositions to take advantage of the many physical properties and overcome the price disadvantage.

In the past, various fillers and reinforcing agents have been added to HPEPs to reduce the cost and reinforce the polymer matrix. Fillers and/or reinforcing agents that have been added include glass fibers, asbestos, graphitic carbon fibers, amorphous carbon fibers, synthetic polymeric fibers, aluminum fibers, steel fibers, silica, clays, talc, mica, polytetrafluoroethylene, among others, as has been reported in U.S. Pat. No. 4,548,039. While fillers tend to reduce the overall cost of articles made from the HPEP blends, their inclusion usually involves a concomitant reduction in mechanical properties. Thus, there is a significant need that exists for new high performance engineering polymer compositions that have superior physical properties, yet without high cost. There is also a need for further improvements in HPEP compositions.

SUMMARY OF THE INVENTION

This invention is directed to unique high performance engineering polymer compositions that offer a number of significant advantages in articles molded therefrom including lower density, high temperature stability, moisture resistance and moldability by conventional molding equipment. The engineering polymer compositions of this invention comprise a wholly aromatic engineering polymer and a polymeric polyvalent metal aromatic polycarboxylate as a high temperature extender.

The wholly aromatic polymer has aromatic rings forming the main chain of the polymer and is devoid of methylene groups in the main chain. As used herein the term "wholly aromatic" refers to an engineering polymer in which each recurring monomeric unit contributes at least one aromatic nucleus to the polymer backbone. The polymeric polyvalent metal aromatic carboxylate is employed in the engineering polymer composition as a high temperature additive in an effective amount for extending the engineering polymer while substantially maintaining or improving its engineering properties. The polymeric polyvalent metal aromatic carboxylate is homogeneously dispersible, non-migratable, non-extractable and heat stable at temperatures for processing the engineering polymer.

It has been found that a polymeric metal carboxylate when contained in an effective amount will even improve the physical properties of the HPEP, as exemplified by a liquid crystal polymer (LCP). For instance, it has been found that when blends of LCP and a polymeric metal carboxylate are formulated, mechanical properties of articles molded therefrom such as elongation at break, tensile strength and modulus are all increased. Other engineering polymers such as polyether ether ketone and polyphenylene sulfide have been found to produce similar results when extended with the polymeric metal carboxylate. These extended engineering polymers exhibited homogeous dispersions and adhesion of the polymeric metal carboxylate in the engineering polymer matrix with increase in modulus, strength, and strain until break. Accordingly, high performance engineering polymers are provided by this invention as extended by polymeric metal carboxylates while substantially maintaining or improving the engineering properties of the polymers.

In a preferred form, a thermotropic liquid crystal polymer such as a copolymer of hydroxybenzoic acid (about 75 mole %) and hydroxynaphthoic acid (about 25 mole %), i.e., Celanese Vectra A950 is used. This LCP and calcium terephthalate are blended and molded into test bars to demonstrate the benefits of the invention. Strong adhesion between the LCP and the calcium terephthalate has been observed. Tensile strength, elongation at break and modulus were determined for such test bars and, quite unexpectedly, all three properties were improved. These results exemplify the broader aspects of this invention where a new class of additives selected from polymeric polyvalent metal aromatic carboxylates are added to liquid crystal polymers as property extenders, reinforcing agents and even agents to improve the physical properties of molded articles produced therefrom. Other engineering polymers as mentioned above including polyether ether ketone and polyphenylene sulfide in engineering polymer compositions with the polymeric polyvalent metal aromatic polycarboxylate produced similar results.

In a broader aspect, the high performance engineering polymer suitable for use in the present invention may be selected from a class of well known wholly aromatic polymers having aromatic rings forming the main chain of the polymer and devoid of methylene groups in the main chain. As members of this class, included are polyphenylene sulfide, polyphenylene oxide, polysulfone, polycarbonate, polyarylate, liquid crystal polymers, polyethersulfone, polyarylsulfone, polyether ether ketone and polyether ketone, and blends thereof. Among the wholly aromatic liquid crystal polymers (LCPs) included are wholly aromatic polyesters, aromatic-aliphatic polyesters, wholly aromatic poly (ester-amides), aromatic-aliphatic poly(ester-amides), aromatic polyazomethines, aromatic polyester-carbonates, and mixtures of the same. Furthermore, the polymeric polyvalent metal aromatic carboxylate may also be selected from the broad class of polymeric metal salts where the polymeric carboxylate group is selected from the group consisting of terephthalate, isophthalate, trimellitate, pyromellitate, 2,6-naphthalene dicarboxylate and trimesate. The polyvalent metal salt of the polymeric carboxylate is preferably selected from the group consisting of magnesium, calcium, strontium, barium, zinc and aluminum for safety and ecological reasons. The most preferred polymeric metal carboxylate is calcium terephthalate. Amounts on the order of from about 10 to about 50% by volume of such polymeric metal carboxylates may be employed in blends with the engineering polymer. It has also been found that there are critical ranges of amounts of the polymeric metal carboxylate in the blend in order to obtain the desired benefits and improvements according to this invention, depending upon the specific engineering polymer and polymeric metal carboxylate employed.

The high performance engineering polymer compositions of this invention containing the polymeric metal carboxylate, and molded or extruded articles produced from such compositions, as well as the advantages of such compositions, will be further understood with reference to the detailed description hereinafter.

DETAILED DESCRIPTION

I. High Performance Engineering Polymers Generally

A. Wholly Aromatic Engineering Polymers

The high performance engineering polymers suitable for use in accordance with the principles of this invention have been well developed in the art. As employed herein these polymers fall into a class of wholly aromatic polymers having aromatic rings forming the main chain of the polymer and devoid of methylene groups in the main chain. As indicated above "wholly aromatic" is employed herein refers to the polymers in which each recurring monomeric unit contributes at least one aromatic nucleus to the polymer backbone. A number of high performance engineering polymers are currently available that fall into this class and they are as follows:

(1) polycarbonate (Lexan by General Electric Plastics) having the formula:

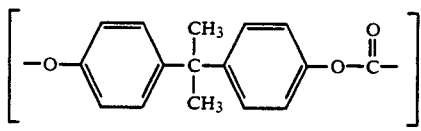

(2) polyarylate (Ardel by Amoco) having the formula:

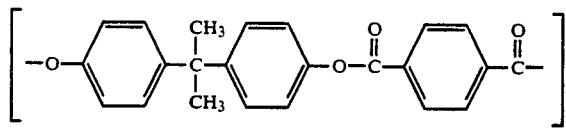

(3) polycarbonate copolymer containing a numeric carbonate and aromatic ester groups of (1) and (2), above.

(4) polyphenylene ether having the following formula:

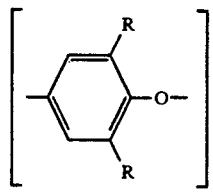

(5) polysulfone (Udel by Amoco) having the following formula:

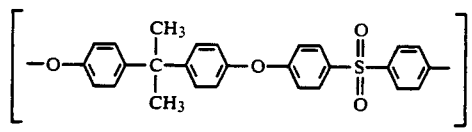

(6) polyethersulfone (Victrex PES by ICI Americas) have the following formula:

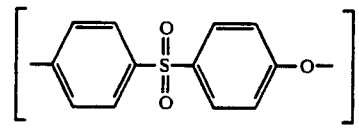

(7) polyarylsulfone (Radel by Amoco) having the following formula:

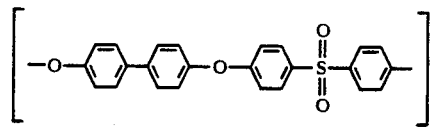

(8) Copolymer or blend of polyethersulfone and polysulfone of (5) and (7).

(9) polyphenylene sulfide or "PPS" (Ryton by Phillips 66) having the following formula:

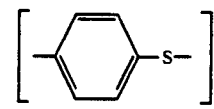

(10) polyether ketone (Victrex PEK by ICI Americas) having the following formula:

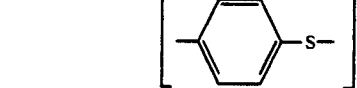

(11) polyether ether ketone or "PEEK" (Victrex PEEK by ICI Americas) having the following formula:

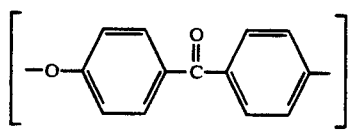

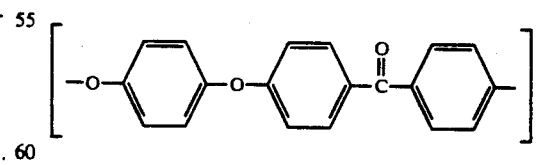

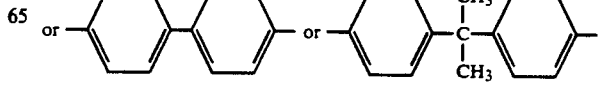

B. Liquid Crystalline Polymers

The liquid crystal polymers suitable for use in accordance with the principles of this invention have been well developed in the art. These polymers have been described by various terms, including "liquid crystalline", "liquid crystal", and "anisotropic". Briefly, the polymers of this class are thought to involve a parallel ordering of the molecular chains often referred to either as the liquid crystal state or the nematic phase of the liquid crystal state. The ordered array gives significant strength and reinforcement in the molded articles without sacrificing processability or heat distortion properties. These polymers are prepared from monomers which are generally long, flat and fairly rigid along the long axis of the molecule and have chain extending linkages that are either coaxial or parallel. The term "wholly aromatic" as employed herein refers to a linear thermotropic liquid crystal polymer in which each recurring monomeric unit contributes at least one aromatic nucleus to the polymer backbone. The polymers may be lyotropic or thermotropic liquid crystal polymers. Lyotropic liquid crystal polymers are polymers which are liquid crystalline in solution. Thermotropic liquid crystal polymers readily form liquid crystals (i.e., exhibit anisotropic properties) in the melt phase. Such properties may be confirmed by conventional polarized light techniques whereby crossed polarizers are utilized. More specifically, the anisotropic phase may be confirmed by the use of a Leitz polarizing microscope at a magnification of 40X with the sample on a Leitz hot stage and under nitrogen atmosphere. The polymer is optically anisotropic, i.e., it transmits light when examined between crossed polarizers. Polarized light is transmitted when the sample is optically anisotropic even in the static state.

Classes of polymers from which the thermotropic liquid crystalline polymer suitable for use in the present invention may be selected include wholly aromatic polyesters, aromatic-aliphatic polyesters, wholly aromatic poly(ester-amides), aromatic-aliphatic polyesters, aromatic poly(ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide), and mixtures of the same. In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Wholly aromatic polyesters that exhibit thermotropic liquid crystalline properties include those disclosed in the following U.S. Pat. Nos. which are herein incorporated by reference Nos.: 3,991,012; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; 4,337,191 and 4,355,134.

Aromatic-aliphatic polyesters that exhibit thermotropic liquid crystalline properties are copolymers of polyethylene terephthalate and hydroxybenzoic acid as disclosed in Polyester X-7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I Preparation and Properties of p-Hydroxybenzoic Acid Copolymers", Journal of Polymer Science, Polymer Chemistry Edition, Vol. 14, pages 2043 to 2058 (1976), by W. J. Jackson, Jr. and H. F. Kuhfuss. See also U.S. Pat. Nos. 4,138,842 and 4,355,133 which are herein incorporated by reference.

Wholly aromatic and aromatic-aliphatic poly(ester-amides) that exhibit thermotropic liquid crystalline properties are disclosed in U.S. Pat. Nos. 4,272,625; 4,330,457; 4,339,375; 4,341,688; 4,351,917; 4,351,918 and 4,355,132.

Aromatic polyazomethines that exhibit thermotropic liquid crystalline properties are disclosed in U.S. Pat. Nos. 3,493,522; 3,493,524; 3,503,739; 3,516,970; 3,516,971; 3,526,611; 4,048,148 and 4,122,070. Each of these patents is herein incorporated by reference in its entirety. Specific examples of such polymers include poly(nitrolo-2-methyl-1,4-phenylenenitriloethylidyne-1,4-phenyleneethylidyne); poly(nitrolo-2-methyl-1,4-phenylenenitri-lomethlidyne-1,4-phenylenemethylidyne); and poly(nitrolo-2-chloro-1,4-phenylenenitrilomethylidyne-1,4-phenylene-methylidyne).

Aromatic polyester-carbonates that exhibit thermotropic liquid crystalline properties are disclosed in U.S. Pat. Nos. 4,107,143 and 4,284,757, and in commonly assigned U.S. Ser. No. 319,024, filed Nov. 6, 1981, now U.S. Pat. No. 4,371,660, which are herein incorporated by reference. Examples of such polymers include those consisting essentially of p-oxybenzoyl units, p-dioxyphenyl units, dioxycarbonyl units, and terephthaloyl units.

The above thermotropic liquid crystalline polymers preferred for use possess a melting temperature within the range that is amenable to melt extrusion or molding while employing commerically available equipment. For instance, thermotropic liquid crystalline polymers are selected which exhibit a melting temperature somewhere within the range of approximately 250° to 400° C. Other examples of liquid crystalline polymer compositions are disclosed in U.S. Pat. Nos. 4,710,547; 4,708,976; 4,650,836; 4,624,872; 4,614,784; 4,540,737; 4,536,561; 4,458,039; 4,439,578 and 4,377,681. These patents are merely listed for purposes of illustration and are incorporated herein by reference as being directed to examples of thermotropic liquid crystal polymers suitable for use in accordance with this invention.

High performance engineering polymers under the above detailed descriptions are generally those which in a substantially pure state are found to have the following properties:

1. Tensile strength, per ASTM D 638, of about 8000 psi or greater,

2. Flexural strength, per ASTM D 790, of about 12,000 psi or greater,
3. Elongation at break, per ASTM D 638, of at least about 2%.
4. Deflection temperature under of load of 264 psi, per ASTM D 648, of at least about 275° F.
5. Impact strength, per ASTM D 256A, of at least about 1 ft-lb/in.

The above properties of 1, 2, 4, and 5 enable the polymer to be used structurally as an engineering material in competition with metals, wood or glass, without providing a brittle product with reference to the elongation at break. In accordance with the principles of this invention the high temperature polymeric metal carboxylate is used in an effective amount to extend the engineering polymer while substantially maintaining or improving its properties. A person of ordinary skill in the art will understand this scope and meaning of the term "high performance engineering polymer" as used herein with reference to the above detailed description. For instance, it is considered that a engineering polymer is extended and reinforced if the tensile strength and flexural strength are increased by blending with the high temperature additive without any significant or substantial loss. If the extension and reinforcement widens the scope of application of the engineering polymer compositions, then it is considered that the polymer has been improved.

II - Polymeric Polyvalent Metal Salts of Aromatic Polycarboxylic Acids

The polymeric polyvalent metal aromatic polycarboxylates suitable for use in accordance with the principles of this invention may be derived from a broad class of compounds. In short, the term "polymeric metal carboxylate" is used hereinafter to define a member of this class.

The polymeric polyvalent metal salts are divalent, trivalent or higher valent metal salts of aromatic polycarboxylic acids exemplified by terephthalic, isophthalic, trimellitic, pyromellitic, trimesic and 2,6-naphthalene dicarboxylic acids. The metal cations of these salts include divalent calcium, magnesium, cadmium, zinc, lead, cobalt, strontium, barium, nickel, copper and tin ions; and the trivalent aluminum, cerium, indium, iron, cesium and chromium ions. Preferably, the metal cations include calcium, magnesium, strontium, barium, zinc and aluminum. Polyfunctional aromatic polycarboxylic acids useful in accordance with the principles of this invention may be exemplified by the aromatic nucleus of benzene, naphthalene, anthracene or the like. In a preferred form, the polymeric metal carboxylate includes the 1,4 benzene dicarboxylate group in the polymeric structure.

The essential criteria for the polymeric polyvalent metal salts of this invention are the polymeric nature of the aromatic polycarboxylate and its thermal stability at processing temperatures of the engineering polymer. In addition, the polymeric metal carboxylate is homogeneously dispersible, non-migratable and non-extractable in the engineering polymer composition. Thus, it will be understood that while a number of polymeric salts have been actually exemplified hereinafter, others may be used to accomplish the purposes of this invention. It is believed that certain salts exist as substantially linear polymers in the divalent metal-dicarboxylate form with the equivalence of the oxygens bonded to the metal ion. However, other forms may be crosslinked where the functionality of the metal and carboxylates admit of crosslinking. Thus, the term "polymeric metal carboxylate" has been adopted to herein define this general class useful according to the broader aspects of the compositions and methods of this invention. The class of polymeric metal carboxylates suitable for use according to this invention all are characterized by heat stability at the processing temperatures of the high performance engineering polymer. The heat stabilities of polymeric metal terephthalate salts are exemplified by the decomposition temperatures listed in the following Table.

TABLE I

Decomposition Temperatures of Polymeric Metal Terephthalates

| Metal | Decomposition Temperature |
|---|---|
| Aluminum | 540° C. |
| Barium | 640° C. |
| Cadminum | 430° C. |
| Calcium | 620° C. |
| Cobalt | 475° C. |
| Magnesium | 625° C. |
| Lead | 425° C. |
| Nickel | 440° C. |
| Strontium | 630° C. |
| Zinc | 430° C. |

All determine by means of TGA (thermogravimetric analysis) under nitrogen at a heating rate of 10° C./minute In addition to the decomposition temperatures of Table I polymeric terephthalates, the following TABLES II through VII disclose decomposition temperatures of other polymeric metal carboxylates as were determined by differential scanning calorimetry in accordance with the practice described in ASTM Standard D3418.

TABLE II

Decomposition Temperatures of Other Polymeric Metal Terephthalates (Anion Abbreviated as "T")

| Metal | Decomposition Temperature |
|---|---|
| GeOT | 350° C. |
| SeT$_2$ | 375° C. |
| TeT$_2$ | 375° C. |
| Dy$_2$T$_3$ | 650° C. |
| HfT$_2$ | 485° C. |
| Ga$_2$T$_3$ | (3 Stage) |
|  | 380° C. |
|  | 550° C. |
|  | 675° C. |
| WT$_3$ | 450° C. |
| Ta$_2$O$_3$T$_2$ | 375° C. |
| MoO$_2$T | 350° C. |
| SnT | 430° C. |
| SnT$_2$ | 360° C. |
| HgT | 360° C. |

TABLE III

Decomposition Temperatures of Polymeric Metal Trimesates (Anion Abbreviated as "M")

| Metal | Decomposition Temperature |
|---|---|
| Zn$_3$M$_2$ | (2 Stage) |
|  | 500° C. |
|  | 750° C. |
| GaM | (2 Stage) |
|  | 450° C. |
|  | 750° C. |
| HfM$_2$ (but only 2 | 440° C. |

TABLE III-continued
Decomposition Temperatures of Polymeric Metal Trimesates (Anion Abbreviated as "M")

| Metal | Decomposition Temperature |
|---|---|
| COOH reacted) | |
| WM$_3$ | 450° C. |
| MoOM | 440° C. |
| TaOM | 440° C. |

TABLE IV
Decomposition Temperatures of Polymeric Metal Trimellitates (Anion Abbreviated as "TM")

| Metal | Decomposition Temperature |
|---|---|
| TaO(TM) | 500° C. |
| Mo(TM)$_2$ | 325° C. |
| Hf(TM)$_2$ (but only 2 of 3 acid groups reacted | 325° C. |
| W(TM)$_3$ | 375° C. |
| Ga(TM) | 360° C. |

TABLE V
Decomposition Temperatures of Polymeric Metal Pyromellitates (Anion Abbreviated as "PM")

| Metal | Decomposition Temperature |
|---|---|
| Ga(PM) (but only 3 of 4 acid groups reacted | 350° C. |
| W$_2$(PM)$_3$ | 480° C. |
| Hf(PM) | 375° C. |
| MoO(PM) | 330° C. |
| Ta$_2$O(PM)$_2$ | 320° C. |

TABLE VI
Decomposition Temperatures of Polymeric Metal 5-sulfonate-1,3-isophthalates (Anion Abbreviated as "SP")

| Metal | Decomposition Temperature |
|---|---|
| TaO(SP) | 350° C. |
| MoO(SP) | 370° C. |
| HfO$_3$(SP) | 310° C. |
| W(SP)$_2$ | 310° C. |
| Ga(SP) | 285° C. |

TABLE VII
Decomposition Temperatures of Polymeric Metal Isophthalates (Anion Abbreviated as "IP")

| Metal | Decomposition Temperature |
|---|---|
| Ga$_2$(IP)$_3$ | (2 Stage) 380° C. 560° C. |
| W(IP)$_3$ | 385° C. |
| Hf(IP)$_2$ | 410° C. |
| MoO$_2$IP | 335° C. |
| Ta$_2$O$_3$(IP)$_2$ | 340° C. |

The high temperature stabilities of the polymeric metal carboxylates are thus distinguishable from the low temperature behavior of benzoates and orthophthalates, the latter of which are typical of that of metal salts of organic acids. Salt decomposition temperatures of acetates, stearates and other benzoates, recorded in the literature, suggests 200°–280° C. as the normal range.

BRIEF DESCRIPTION OF THE DRAWING

FIG. 1 is a stress-strain curve for polymer compositions of the invention.

FIG. 1-LCP Examples

The following examples illustrate the practice of this invention and a number of its parameters. With reference to FIG. 1, a stress-strain curve is illustrated for liquid crystal polymer compositions of this invention containing various amounts of calcium terephthalate. These compositions were formulated by using Celanese Vectra A950 (identified above) thermotropic liquid crystal polymer (LCP) as blended with polymeric calcium terephthalate (CAT) fibers. The LCP and CAT were dried overnight in an oven at 180° C. Thereafter, the LCP and CAT were weighed (calculated to yield 60 ml) and then added to a Brabender mixer and mixed at 300° C. for 20 minutes. The resulting blend was placed in a frame mold and heated to 200° C. in a press. Pressure was increased to approximately 10 MPa in three stages and released after the first two stages and maintained upon reaching 10 MPa (1 MPa is equal to approximately 1420 psi). The temperature was increased to 300° C. under the 10 MPa pressure. The press was water cooled to room temperature under pressure. Four dumbbell shaped tensile test bars were cut and routed from the compression molded plaques and tested on an Instron tensile tester at 1%/minute in a manner similar to ASTM 638. The tensile strength, elongation at break and modulus were calculated by averaging the specimens tested. These results are reported in FIG. 1 for varying amounts of CAT with LCP.

With reference to FIG. 1, curve A illustrates that the LCP without any CAT had a maximum elongation of about 2% at break point and a tensile of about 40 MPa. Curve B illustrates that where 20% by volume CAT was added to the LCP, both elongation and tensile improved at the same time, i.e., elongation at break was about 5% and tensile strength was about 50 MPa. It should be observed that improvement in both elongation and tensile at the same time is unexpected. A filler would not produce such result. This data demonstrates strong adhesion between the LCP and the CAT and such is considered to be responsible for the enhancement of the properties. Usually, an increase in elongation occurs at the expense of decreasing the tensile. The surprising effects of increased elongation and tensile are also observed at 36% by volume CAT in the LCP where elongation was increased to about 3% and tensile strength to about 53% MPa. At 50% by volume CAT, the increased effects on elongation and tensile strength are lost, thereby indicating that there is a critical range of amounts of CAT and LCP in order to obtain the desired improvements according to the principles of this invention. When one considers that calcium terephthalate is just as brittle as glass in its pure material state, indeed the results according to FIG. 1 and the above data are quite surprising. These results illustrate the principles of this invention and differentiate it from the prior art.

The test bars molded as above from the LCP alone and with polymeric calcium terephthalate demonstrated high temperature resistance, heat stability and moisture resistance as illustrated by Table VIII hereinafter.

TABLE VIII

STABILITY EVALUATIONS

| CONDITION | LCP | LCP & POLYMERIC CALCIUM TEREPHTHALATE |
|---|---|---|
| 24 Hours at 450° F | No discoloration No weight loss | No discoloration No weight loss |
| 24 Hours Water Immersed | No weight change | No weight change |
| 2 Hours Boiling Water | 0.1% weight change | 0.1% weight change |

The method of preparing the polymeric calcium terephthalate fibers used in the foregoing experiments with reference to FIG. 1 involved charging 750 kgs of water into a reactor equipped with an agitator and about 3.64 kgs of sodium salt of polymethylacrylic acid dispersing agent having an average molecular weight of about 12,000 was added thereto to form a good dispersion. Thereafter, terephthalic acid in an amount of 31.61 kilograms was added slowly to the charged reactor to form a uniform dispersion, whereupon the aqueous charge was heated to about 85°-90° C. and held at this temperature for the remainder of the preparation. Over a period of about 1 to 3 hours, 15.14 kgs of Ca(OH)$_2$ were added slowly at as uniform a rate as possible. When all the calcium hydroxide had been added, mixing was continued until crystals of the terephthalic acid were all consumed as determined by microscopic examination at 60X during which time fibers of polymeric calcium terephthalate precipitated. This method normally produces fibers of polymeric calcium terephthalate averaging in the range of about 5:1 to about 20:1 aspect ratio; having an average particle size of less than about 100 mesh. As these fibers are produced, they are easily differentiated from the cubic or rhombic crystals of terephthalic acid that are consumed during the preparation.

Tables IX and X-Other HPEP Examples

The detailed experiments with reference to FIG. 1 and the LCP engineering polymer employed therein with CAT were repeated with other engineering polymers. Tables IX and X have been prepared and represent the use of other engineering polymers without any CAT and with increasing amounts of CAT. The engineering polymers employed were PEEK, PPS, Vectra, Kodak LCP and Xydar. PEEK, PPS and Vectra were previously identified. Xydar by Dartco Mfg. Co. is an LCP copolymer of terephthalic acid and biphenol terminated with para-hydroxy benzoic acid. Kodak LCP is a similar LCP. The tensile properties determined for the compositions are reported in Table IX under the columns with Strength (MPa), Modulus (GPa), Strain at Break (%) and a number of tests for each composition. Similarly Table X reports the flexural properties that were ascertained for Vectra and Xydar.

TABLE IX

| % CaT. | | Tensile Properties[1] | | | |
|---|---|---|---|---|---|
| v/v | w/w | Strength, MPa | Modulus, GPa | Strain @ Break, % | No. Tests |
| PEEK | | | | | |
| 0 | 0 | 83 (16) | 2.9 (0.05) | 2.9 (0.2) | 4 |

TABLE IX-continued

| % CaT. | | Tensile Properties[1] | | | |
|---|---|---|---|---|---|
| v/v | w/w | Strength, MPa | Modulus, GPa | Strain @ Break, % | No. Tests |
| 20 | 26 | 68 (6) | 4.1 (0.2) | 1.9 (0.3) | 5 |
| 40 | 48 | 54 (6) | 5.4 (0.4) | 1.1 (0.06) | 3 |
| PPS | | | | | |
| 0 | 0 | 62 (6) | 2.7 (0.02) | 2.5 (0.3) | 3 |
| 20 | 26 | 22 (4) | 4.6 (0.2) | 0.6 (0.07) | 4 |
| 40 | 48 | 30 (2) | 5.2 (0.2) | 1.1 (0.0) | 2 |
| Vectra | | | | | |
| 0 | 0 | 38 (5) | 2.5 (0.1) | 2.3 (0.8) | 2 |
| 20 | 24 | 45 (2) | 3.4 (0.09) | 1.6 (0.09) | 2 |
| 35 | 41 | 19 (2) | 2.7 (0.04) | 0.8 (0.2) | 4 |
| Kodak LCP | | | | | |
| 0 | 0 | 20 (4) | 2.1 (0.2) | 1.1 (0.3) | 3 |
| 20 | 24 | 24 (1) | 3.0 (0.2) | 0.89 (0.07) | 4 |
| 40 | 46 | 20 (2) | 4.0 (0.08) | 0.50 (0.05) | 3 |
| Xydar | | | | | |
| 0 | 0 | 7.8 (2) | 1.6 (0.1) | 0.5 (0.1) | 2 |
| 20 | 24 | 5.9 | 3.1 | 0.2 | 1 |

[1]Standard deviation in brackets.

TABLE X

| % CaT. | | Flexural Properties[1] | | | |
|---|---|---|---|---|---|
| v/v | w/w | Strength, MPa | Modulus, GPa | Strain @ Break, % | No. Tests |
| Vectra | | | | | |
| 0 | 0 | 56 (18) | 3.8 (0.6) | 1.8 (0.4) | 3 |
| 20 | 24 | 66 (7) | 4.8 (0.2) | 1.8 (0.2) | 4 |
| 35 | 41 | 33 (2) | 5.3 (0.6) | 0.75 (0.03) | 4 |
| Xydar | | | | | |
| 0 | 0 | 26 (4) | 2.3 (0.1) | 1.6 (0.3) | 4 |
| 20 | 24 | 29 (6) | 3.8 (0.1) | 1.1 (0.2) | 4 |
| 40 | 46 | 24 (3) | 4.6 (0.4) | 0.65 (0.07) | 3 |

[1]Standard deviation in brackets.

With reference to Tables IX and X, it has been demonstated that significant and effective amounts of polymeric calcium terephthalate "CAT" (10% to 40% v/v, 46% w/w) can be simply and efficiently blended into high performance engineering polymers of the wholly aromatic type. In a manner similar to the data reported with reference to FIG. 1, Tables IX and X demonstrate fracture surfaces of liquid crystal polymers, polyether ether ketone and polyphenylene sulfide after melt blending with CAT. The data also reveal good mixing and adhesion of the CAT to the polymer matrix. The CAT extended polymers exhibit an increase in modulus, strength and strain until break. When the low density of CAT is compared with mineral fillers and glass fibers, it will be understood that the high temperature additives of this invention can be very cost competitive additives. Furthermore, the above experiments demonstrate that quite surprisingly a new class of high temperature additives has been found for extending the properties of engineering polymers of the wholly aromatic type while substantially maintaining or even improving the engineering properties.

The compositions of the present invention can contain nuceating agents, fillers, pigments, fibers, mineral reinforcing agents, antioxidants, stabilizers, plasticizers, lubricants, fire-retardants and other additives.

Having described this invention in its various forms including engineering polymer compositions, methods of making such with polymeric polyvalent metal aromatic carboxylates, and molded articles resulting therefrom, it will be apparent to a person of ordinary skill in the art that other modifications may be made without departing from the scope of this invention.

What is claimed is:

1. A high performance engineering polymer composition comprising
   a wholly aromatic engineering polymer having aromatic rings forming the main chain of the polymer and devoid of methylene groups in said main chain, and
   a polymeric polyvalent metal aromatic polycarboxylate, as a high temperature additive in an effective amount for extending said engineering polymer while substantially maintaining or improving its engineering properties,
   said polymeric carboxylate being dispersible, non-migratable, non-extractable, and heat stable at temperatures for processing said engineering polymer.

2. The composition of claim 1 wherein said polymer is selected from the group consisting of polyphenylene sulfide, polyphenylene oxide, polycarbonate, polyarylate, liquid crystal polymer, polyarylethersulfone, polyarylsulfone, and polyarylether ketone, and blends thereof.

3. The composition of claim 1 wherein the aromatic polycarboxylate group of said polymeric polycarboxylate is selected from the group consisting of terephthalate, isophthalate, trimellitate, pyromellitate, trimesate and 2,6-naphthelene dicarboxylate.

4. The composition of claim 1 wherein said polyvalent metal of said polymeric polycarboxylate is selected from the group consisting of magnesium, calcium, strontium, barium, zinc and aluminum.

5. The composition of claim 4 wherein the polymeric polycarboxylate is calcium terephthalate.

6. The composition of claim 1 wherein the polymeric carboxylate is dispersed in said engineering polymer in a particulate form having an aspect ratio of at least about 5:1.

7. The composition of claim 6 wherein the particle size of said particulate form is less than about 100 mesh.

8. The composition of claim 6 wherein the aspect ratio is on the order of about 5:1 to about 20:1.

9. The composition of claim 1 wherein said polymeric polycarboxylate is contained in an amount of from about 10 to about 50% by volume.

10. A heat stable moisture-resistant thermoplastic engineering polymer composition comprising
    a wholly aromatic thermoplastic engineering polymer having aromatic rings forming the main chain of the polymer and devoid of methylene groups in said main chain, said polymer selected from the group of polyphenylene sulfide, polyphenylene oxide, polyarylate, liquid crystal polymer, polyarylethersulfone, polyarylsulfone, polycarbonate, and polyarylether ketone, and blends thereof,
    an anhydrous polymeric polyvalent metal aromatic polycarboxylate having an aromatic polycarboxylate group selected from the group consisting of terephthalate, isophthalate, trimellitate, pyromellitate and trimesate and polyvalent metal of said polymeric carboxylate is selected from the group consisting of calcium, magnesium, strontium, barium, zinc and aluminum,
    said polymeric carboxylate contained as a high temperature additive in an effective amount for extending said engineering polymer while substantially maintaining or improving its engineering properties and said polymeric carboxylate being dispersible, non-migratable, non-extractable and heat stable at processing temperatures of said engineering polymer.

11. The composition of claim 10 wherein said polymeric carboxylate is calcium terephthalate.

12. A heat stable moisture-resistant thermoplastic engineering polymer composition comprising
    a wholly aromatic thermoplastic engineering polymer having aromatic rings forming the main chain of the polymer and devoid of methylene groups in said main chain, said polymer selected from the group of polyphenylene sulfide, polyphenylene oxide, polyarylate, liquid crystal polymer, polyarylethersulfone, polyarylsulfone, polycarbonate, and polyarylether ketone, and blends thereof,
    an anhydrous polymeric polyvalent metal aromatic polycarboxylate,
    said polymeric carboxylate contained as a high temperature additive in an effective amount for extending said engineering polymer while substantially maintaining or improving its engineering properties and said polymeric carboxylate being dispersible, non-migratable, non-extractable and heat stable at processing temperatures of said engineering polymer,
    wherein said polymeric carboxylate is contained in an amount of at least about 10% by volume.

13. The composition of claim 12 wherein said polymeric carboxylate is contained in an amount of from about 10 to about 50% by volume.

14. A heat stable moisture-resistant thermoplastic engineering polymer composition comprising
    a wholly aromatic thermoplastic engineering polymer having aromatic rings forming the main chain of the polymer and devoid of methylene groups in said main chain, said polymer selected from the group of polyphenylene sulfide, polyphenylene oxide, polyarylate, liquid crystal polymer, polyarylethersulfone, polyarylsulfone, polycarbonate, and polyarylether ketone, and blends thereof,
    an anhydrous polymeric polyvalent metal aromatic polycarboxylate,
    said polymeric carboxylate contained as a high temperature additive in an effective amount for extending said engineering polymer while substantially maintaining or improving its engineering properties and said polymeric carboxylate being dispersible, non-migratable, non-extractable and heat stable at processing temperatures of said engineering polymer,
    with said polymeric polyvalent metal aromatic polycarboxylate having a 1,4-benzene dicarboxylic acid group in the polymer chain.

15. The composition of claim 14 wherein said benzene dicarboxylate group is terephthalate and the polyvalent metal is selected from the group consisting of calcium, magnesium, strontium, barium, zinc and aluminum.

16. The composition of claim 14 wherein said liquid crystal polymer is a copolymer of hydroxybenzoic acid and hydroxynaphthoic acid.

17. A method for molding a heat stable-moisture resistant article comprising
    homogeneously blending a wholly aromatic engineering polymer having aromatic groups forming the main chain of the polymer and devoid of methylene groups in said main chain with a multitude of particles of an anhydrous polymeric polyvalent metal aromatic polycarboxylate, and molding the homogeneous mixture at temperatures below the decomposition temperature of said polymeric carboxylate to mold said mixture into a useful article, said polymeric polycarboxylate contained in an effective amount for extending said engineering polymer while substantially maintaining or improving its engineering properties in the molded article.

18. The method of claim 17 wherein said engineering polymer is selected from the group consisting of polyphenylene sulfide, polyphenylene oxide, polycarbonate, polyarylate, liquid crystal polymers, polyarylethersulfone, polyarylsulfone, and polyarylether ketone, and blends thereof.

19. The method of claim 17 wherein the aromatic polycarboxylate group of said polymeric carboxylate is selected from the group consisting of terephthalate, isophthalate, trimellitate, pyromellitate, trimesate and 2,6-naphthelene dicarboxylate.

20. The method of claim 17 wherein said engineering polymer is a liquid crystal co-polymer of hydroxybenzoic acid and hydroxynaphthoic acid.

21. The method of claim 17 wherein said aromatic polycarboxylate group of said polymeric polycarboxylate is selected from the group consisting of terephthalate, isophthalate, trimellitate, pyromellitate, trimsate and 2,6-naphthelene dicarboxylate and said polyvalent metal of said polymeric carboxylate is selected from the group consisting of magnesium, calcium, strontium, barium, zinc and aluminum.

22. The method of claim 18 wherein the polymeric carboxylate is calcium terephthalate.

23. The method of claim 22 wherein the calcium terephthalate is contained in an amount of from about 10 to about 50% by volume.

* * * * *